United States Patent
Bhaskaran et al.

(10) Patent No.: US 12,411,245 B1
(45) Date of Patent: Sep. 9, 2025

(54) COMPONENT TESTING BASED ON SENSOR DATA

(71) Applicant: Zoox, Inc., Foster City, CA (US)

(72) Inventors: Sreevatsan Bhaskaran, Redwood City, CA (US); Shreyas Sudhir Mundhra, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 893 days.

(21) Appl. No.: 17/590,765

(22) Filed: Feb. 1, 2022

(51) Int. Cl.
*G01S 17/93* (2020.01)
*G01S 7/497* (2006.01)
*G01S 17/08* (2006.01)
*G01S 17/931* (2020.01)

(52) U.S. Cl.
CPC ............ *G01S 17/931* (2020.01); *G01S 7/497* (2013.01); *G01S 17/08* (2013.01)

(58) Field of Classification Search
None
See application file for complete search history.

(56) References Cited

U.S. PATENT DOCUMENTS

| | | | |
|---|---|---|---|
| 10,928,490 B2* | 2/2021 | Tatipamula | G01S 17/88 |
| 11,376,960 B2* | 7/2022 | Hao | G01S 7/4026 |
| 11,514,681 B2* | 11/2022 | Kaku | B60W 50/0205 |
| 11,681,030 B2* | 6/2023 | Wachter | G01S 7/4817 |
| | | | 356/5.08 |
| 2010/0076709 A1* | 3/2010 | Hukkeri | G01S 17/87 |
| | | | 356/6 |
| 2017/0212215 A1* | 7/2017 | Hellinger | G01S 13/931 |
| 2018/0272998 A1* | 9/2018 | Schmidt | B05B 7/2424 |
| 2020/0094783 A1* | 3/2020 | Dubey | B60S 1/0844 |
| 2020/0284887 A1* | 9/2020 | Wachter | G01S 13/867 |
| 2020/0391231 A1* | 12/2020 | Arunmozhi | F16L 27/023 |

\* cited by examiner

*Primary Examiner* — Hovhannes Baghdasaryan
(74) *Attorney, Agent, or Firm* — Lee & Hayes, P.C.

(57) ABSTRACT

Techniques for detecting degradation of a component are discussed herein. For example, a computing device can implement a sensor testing component to determine degradation caused by rain, mud, dirt, dust, snow, ice, animal droppings, or other debris on and/or near an outer surface of the lidar sensor. The sensor testing component can apply one or more heuristics and/or machine learned models to the lidar data and/or compare information associated with the lidar data (e.g., intensity, pulse information, etc.) to a baseline to determine an action for a vehicle and/or a size, a type, or a location of an obstruction blocking a lidar beam.

20 Claims, 7 Drawing Sheets

LIDAR DATA 402

RETROREFLECTOR 406

LIDAR DATA 404

RETROREFLECTOR 406

400

LIDAR DATA 408

RETROREFLECTOR 406

LIDAR DATA 410

RETROREFLECTOR 406

FIG. 4B

COMPONENT TESTING BASED ON SENSOR DATA

BACKGROUND

Accurate sensor data is relied upon in various applications including, for example, an autonomous vehicle to traverse the environment. However, the quality of the data collected by sensors may become degraded in certain circumstances, including based on environmental factors such as weather, traffic, or road conditions, as well as based on internal errors or malfunctions that may occur within the sensors themselves. In such cases, the data collected by the sensors may be suboptimal or even unsuitable for use, potentially impacting vehicle navigation, obstacle detection and avoidance, and other functions that rely on the sensor data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4B is a pictorial diagram illustrating a second part of an example implementation to detect a degraded state of an example sensor based on sensor data associated with a retroreflector.

DESCRIPTION

Figure 1:
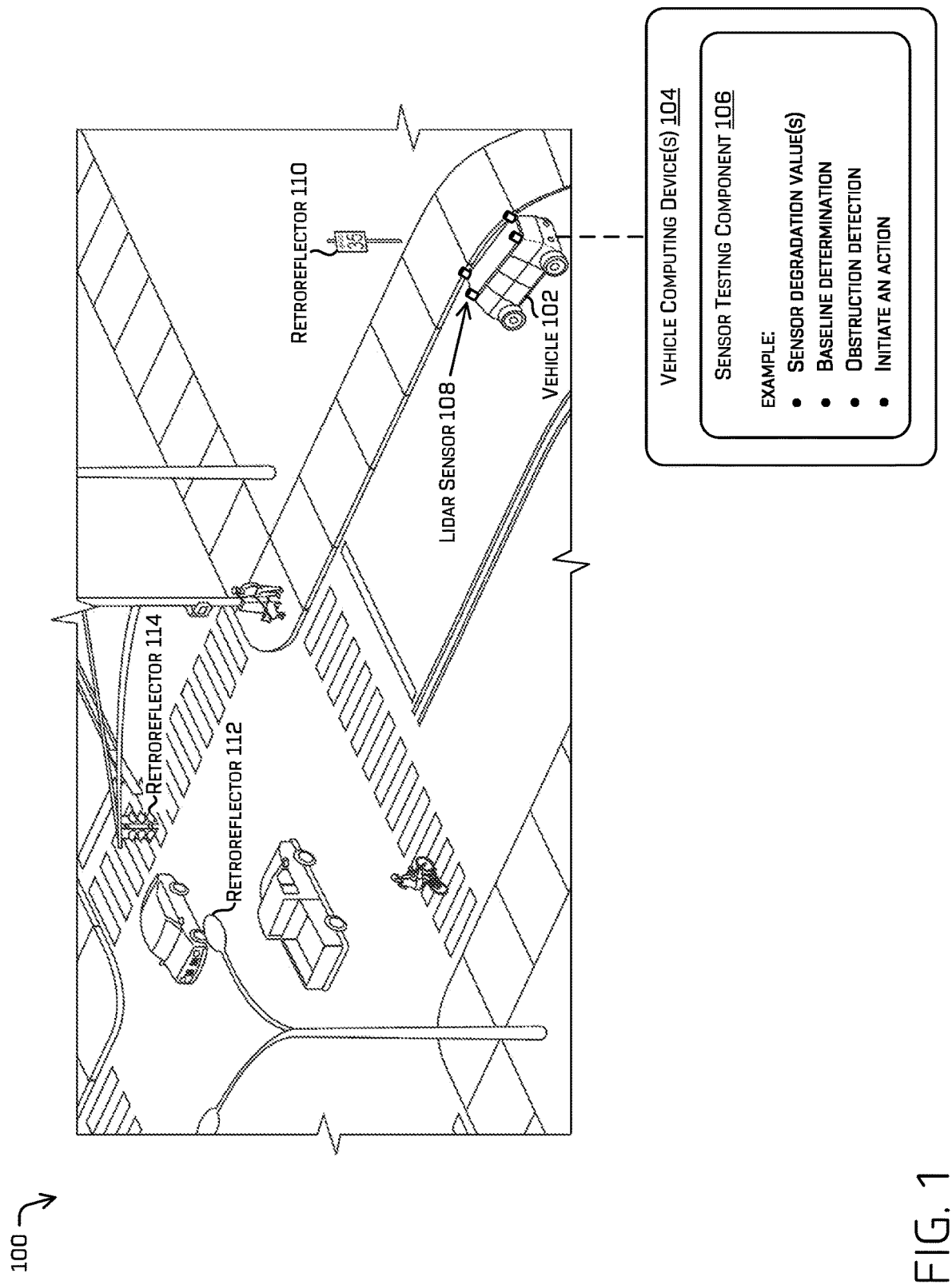
FIG. 1 is an illustration of an example environment, in which an example vehicle computing device determines sensor degradation based on data associated with a retroreflector.

Techniques for detecting degradation of a sensor based on data associated with a retroreflector are discussed herein. The techniques may include determining a degradation state of a lidar sensor due to foreign object(s), material(s), and/or particle(s) on an outer surface of the lidar sensor. For instance, a computing device can implement a sensor testing component to determine degradation caused by rain, mud, dirt, dust, snow, ice, animal droppings, and the like, on and/or near (e.g., less than one centimeter) the outer surface of the lidar sensor. The sensor testing component can determine the degraded state based at least in part on sensor data associated with a retroreflector. The sensor testing component can apply one or more heuristics or other model(s) to the sensor data and/or compare information associated with the sensor data to a baseline to determine whether a portion of the lidar is obstructed.

In some examples, the sensor testing component can compare sensor data received from one or more sensors (e.g., raw lidar data, lidar point cloud data, image data, and so on) to baseline data associated with one or more retroreflector(s). For instance, the baseline data can represent expected results for the retroreflector (e.g., an expected intensity value, an expected amount of reflected light, etc.) for test conditions under which the sensor data is received (e.g., distance, environmental conditions, and so on). By way of example and not limitation, the sensor testing component can determine a difference between the sensor data associated with the retroreflector(s) and baseline retroreflector data, and output a degraded state value indicating a level of lidar sensor degradation (if any) caused by an obstruction on and/or near an outer surface of the lidar sensor. As discussed herein, the baseline data can be specific for each test conditions (e.g., angle of received lidar returns, distance between the lidar sensor and the retroreflector, weather (e.g., fog, rain, ambient light, etc.), time of day, and the like).

In some examples, the degradation detection techniques can include locating a retroreflector in an environment based at least in part on map data representing the environment indicative of an expected location of the retroreflector. For instance, a three-dimensional mesh (or other representation of the environment based on previously acquired sensor data) may be used along with currently received sensor data to localize the sensor in the environment. Based on known retroreflectors associated with the map and the current localization of the sensor, an expected association of the current sensor data and a retroreflector may be assumed or otherwise determined. The sensor testing component can initiate a test of a sensor, such as a lidar sensor associated with an autonomous vehicle, based at least in part on determining the location of the retroreflector. For example, a sensor test can be performed at a threshold distance from the location of the retroreflector, and the sensor testing component can receive sensor data (e.g., lidar returns) associated with a reflective surface of the retroreflector. The sensor data can be compared to baseline retroreflector data for a given distance (and/or the baseline may be relatively modified based on the distance and/or one or more additional environmental factors), and the sensor testing component can predict a degradation state of the sensor based at least in part on the comparison. In some examples, the sensor testing component can initiate an action (e.g., a cleaning, calibration, maintenance, or other action) based at least in part on determining that the degraded state meets or exceeds a degradation threshold.

Using the techniques described herein, a computing device can determine a degraded state of a sensor (e.g., a lidar sensor) operating on an autonomous vehicle based on reflectivity data received from one or more retroreflectors. The degraded state can be used to control the autonomous vehicle (e.g., determine a vehicle trajectory, modify perception operations to reduce reliance on the portion of the sensor that is obstructed, operate the vehicle in one direction, pull the vehicle over, initiate a communication to a remote operator for assistance, etc.), initiate a cleaning operation (e.g., cause an air jet or other cleaning system to remove the obstruction, change a parameter of a sensor to compensate for the obstruction, etc.), and/or initiate a maintenance operation (e.g., perform a sensor calibration, replace a sensor, etc.). By implementing the techniques described herein, safety of the autonomous vehicle can be improved by performing an action that mitigates an obstruction of a sensor used for "seeing" an environment.

Generally, the sensor testing component can identify changes between reflectivity data received from a reflective surface of a retroreflector and baseline data representing expected reflectivity data values. The retroreflector can represent a traffic light, a traffic sign, a street sign, a streetlight, a roadway marker, or a sticker, just to name a few. The sensor testing component can determine a difference between the reflectivity data and a baseline selected from available baselines that may be adjusted for different environmental conditions, retroreflector types, and so on. For example, the baseline can depend on environmental data (e.g., time of day, ambient light, weather, etc.), a retroreflector type, distance data representing a distance between the sensor and the retroreflector, vehicle data (e.g., orientation, velocity, pose, etc.), sensor data for one or more sensors, sensor transmission power (e.g., transmission power of a lidar beam emitted from a lidar sensor), azimuth data, elevation data, pulse data, historical degradation data, among others. By determining a baseline as described herein, degraded state determinations can be made by the sensor testing component with more accuracy and efficiency (versus not implementing the techniques). As a non-limiting example, an intensity may vary as the square of the distance (and/or some other function) and a baseline intensity associated with a retroreflector may be modified based on being closer or further away from the retroreflector.

In some examples, the sensor testing component can locate a retroreflector in an environment of a vehicle (e.g., an autonomous vehicle) based on map data, and initiate testing of a lidar sensor coupled to the vehicle at a predetermined distance from the retroreflector. For instance, when the vehicle is positioned within a threshold distance of the retroreflector, a vehicle computing device can test operation of the lidar sensor by emitting one or more beams from the lidar sensor towards the retroreflector. In at least some examples, such lidar sensor emissions may comprise the same emissions used for localizing the vehicle with respect to the map. The sensor testing component can compare lidar returns received from a region of the retroreflector to baseline data that reflects sensor, vehicle, and/or environmental characteristics during the test (again, which may in some examples, be modified based on such environment characteristics). For example, the baseline can reflect expected lidar data from the retroreflector for a given time, ambient light, distance, angle of arrival at the lidar sensor, weather, etc. that matches the conditions during the test. Based on the comparison, the sensor testing component can determine whether the lidar sensor is obstructed or otherwise degraded to an extent that requires an action (e.g., cleaning, replacing, etc.).

In examples when the sensor is a lidar sensor, the sensor testing component can compare lidar data associated with the retroreflector to baseline retroreflector data to determine a level of accuracy of the lidar sensor. For instance, the lidar data can represent intensity data or pulse data associated with a reflective surface of the retroreflector such that sensor testing component compares intensity data and/or pulse data to baseline intensity data and/or baseline pulse data to determine whether the accuracy of the lidar sensor (e.g., a degraded state) is at or above a degradation threshold. In the context of pulse data, the sensor testing component can compare pulse characteristics (e.g., shape, size, etc.) of pulse data received from the lidar sensor with baseline pulse characteristics. For instance, the sensor testing component can implement cross-correlation techniques to determine that a shape of the pulse data differs from an expected baseline pulse shape (e.g., the pulse data has a flattened portion near the amplitude of the pulse) which is indicative of a degraded state caused by an obstruction on or near the lidar sensor.

In various examples, the sensor testing component can receive lidar data representing angle information or spatial information, and determine, based at least in part on the angle information or the spatial information, a size or a location of an obstruction associated with an outer surface (e.g., a lens) of the lidar sensor. In such examples, an action can be performed by a vehicle (or other a robotic device) associated with the lidar sensor. That is, the vehicle can be controlled in an environment based at least in part on the size or the location of the obstruction.

Generally, a lidar sensor can generate a lidar beam for transmission into an environment, and the transmission can be affected by foreign particle(s) on the lidar sensor. The foreign particle(s) can vary in size and particle type thereby affecting a distance the lidar beam travels into the environment from the lidar sensor. For example, the lidar sensor can be obstructed such that the lidar beam fails to travel beyond a lens or housing of the lidar sensor and/or the obstruction can allow some transparency for the lidar beam to capture lidar data at different distances from the lidar sensor (e.g., the obstruction causes scattering, partial reflections, or partial absorption, etc. of the emitted light). Regardless, the sensor testing component can be configured to determine characteristics of the obstruction (e.g., severity, transparency, size, shape, etc.), and determine an action based at least in part on the characteristics of the obstruction (e.g., clean the lidar sensor at the identified location of the obstruction, cause the vehicle to navigate to a safe location, restrict a direction of travel of the vehicle (e.g., in the case of a bidirectional vehicle), cause the vehicle to receive assistance from a teleoperator (e.g., a remote computing device), alter a perception component to reduce reliance on the lidar sensor (e.g., disregarding and/or reducing a weight of one or more sensor values associated therewith) in favor of other available sensors, etc.). In at least some examples, a lidar sensor may be used in dual- or multiple-return mode to receive multiple lidar returns per pulse.

In some examples, sensor data compared to a baseline by the sensor testing component can include data received from one or more sensors (e.g., two lidars sensor, a lidar sensor and a radar sensor, a lidar sensor and an image sensor, or other combinations of sensor types). For instance, a field of view of a lidar sensor, radar sensor, image sensor, etc. can overlap with another field of view of another lidar sensor (or other sensor), and the sensor data processed by the sensor testing component can represent reflectivity data from the retroreflector from both lidar sensors. In at least some such examples, the comparison may not be based on a map and/or prior known retroreflector. As a non-limiting example, a return pulse having a high intensity relative to the emitted pulse at a sufficient distance may be assumed to be associated with a retroreflector. In such an example, pulses from other lidar sensors which intersect the ray or point associated with the return pulse may be compared (accounting for relative changes in distance).

In some examples, a computing device can implement the sensor testing component (or other component or model) to determine an obstruction type (e.g., rain, dirt, dust, snow, ice, animal droppings, etc.) based at least in part on a difference between sensor data and the baseline data, data from an image sensor, etc. In various examples, the sensor testing component can determine a degraded state indicating an amount of lidar beam energy lost and/or transmitted based at least in part on the obstruction type. Generally, the degraded state can represent an obstruction score representing a level of obstruction associated with the sensor.

The techniques can include the sensor testing component reducing an amount of backscattering associated with the lidar sensor. For example, upon detecting an obstruction, the sensor testing component can cause a cleaning system to clean a region of the lidar sensor. In various examples, the sensor testing component can locate a region on the housing of the lidar sensor that is associated with an obstruction, and cause the cleaning system to clean the obstruction in the located region thereby mitigating the backscattering. Additional details of cleaning a sensor are described in U.S. patent application Ser. No. 16/864,146, filed Apr. 30, 2020, entitled "Sensor Pod Cleaning System," which is incorporated herein by reference in its entirety and for all purposes.

In various examples, the lidar data received from the lidar sensor can represent intensity data and/or pulse data associated with different times. The sensor testing component can, for instance, compare intensity information, pulse information, angle information, elevation information, spatial information (e.g., first azimuth information or first channel information), etc., associated with a retroreflector at a first time and a second time after the first time. In such examples, similar to the example above in which two sensors are used, a relative motion of the sensor can be used to determine whether the expected value varies in accordance with assumed properties of the retroreflector. Such motion may be due to movement of the sensor and/or differing collection runs (e.g., which may be multiple hours, days, months, etc. apart).

In some examples, the sensor testing component can determine a baseline based at least in part on a known lidar excitation energy (e.g., transmission laser intensity), historical sensor data associated with the retroreflector, degradation states from a same or different sensor, and the like. As a non-limiting example, the baseline can be normalized for different transmission powers, times, surface types, distances, etc.

In some examples, the sensor testing component can be included in a vehicle computing device of an autonomous vehicle that is bi-directional (a front region can change depending upon a direction of travel). By way of example and not limitation, determining a degraded state caused by an obstruction on a sensor coupled to a front region or rear region of the autonomous vehicle can cause the autonomous vehicle to operate in a single direction that minimizes reliance on the obstructed sensor to improve safety. For instance, in an environment with relatively strong wind and rain, sensors in the front region or the rear region can be impacted differently, and detecting an obstruction on a sensor in the front region or the rear region can be used to determine a direction of travel that causes the lidar sensor to be in a region that is less impacted relative to the other region. In other words, the autonomous vehicle can be controlled in the environment by determining a direction of travel for the autonomous vehicle based at least in part on a location of the lidar sensor on the autonomous vehicle, and a degraded state associated with the lidar sensor.

In some examples, a degraded state of a first sensor can be adjusted based on a degraded state of another sensor. For example, a difference between degraded states of two or more sensors can be used to confirm, verify, or modify a degraded state determination.

In some examples, some or all of the aspects of the techniques for determining a degraded state of a sensor, detecting an obstruction, determining a baseline, etc., can be performed by a machine learned model (e.g., a neural network, a convolutional neural network, a recurrent neural network, a curve fitting, statistical modeling, and the like) trained to perform the particular technique. A machine learned model can be trained based on data manually or automatically annotated to an obstruction amount and/or an obstruction type associated with a lidar sensor, and the like. For instance, the machine learned model can receive annotated data as ground truth representing pulse information and/or intensity information associated with an obstruction. The ground truth can include expected intensity distribution values over an area of a retroreflector to enable the machine learned model to determine whether sensor data received from a sensor is or is not associated with a particular obstruction type.

The degradation detection techniques described herein can improve a functioning of a computing device by providing a robust method of estimating or otherwise determining a level of obstruction associated with a sensor. For example, determining whether a sensor is properly operating can allow subsequent processes associated with an autonomous vehicle (e.g., classification, tracking, prediction, route planning, trajectory generation, and the like) to be performed more accurately, may require less processing power, and/or may require less memory. In some instances, faster and/or more accurate obstruction detection can be used in generating a trajectory of the autonomous vehicle, which can improve safety for occupants of an autonomous vehicle. In some examples, the techniques can be used in a self-test operation associated with a system to evaluate a performance of the system which provides for greatly improved overall reliability and safety outcomes. Further, the techniques discussed herein may be incorporated into a system that can be validated for safety.

FIG. 1 is an illustration of an example environment 100, in which an example vehicle computing device detects determines sensor degradation based on data associated with a retroreflector. For instance, a vehicle 102 can include one or more vehicle computing device(s) 104 (also referred to the vehicle computing device 104) that implements a sensor testing component 106 to determine a degraded state of a lidar sensor 108.

Generally, the sensor testing component 106 can initiate a test of the lidar sensor 108 based at least in part on determining a location of one or more retroreflectors. As shown in FIG. 1, a test can be performed when the vehicle 102 is a threshold distance from a traffic sign (retroreflector 110), a streetlight (retroreflector 112), or a traffic signal (retroreflector 114). For example, the vehicle computing device 104 can receive map data representing the environment 100 and determine a location(s) of the retroreflectors in the environment 100 based at least in part on the map data. The vehicle can send a signal from the lidar sensor 108 to one or more of the retroreflectors at a pre-determined distance from the respective retroreflector.

While example retroreflectors are shown in FIG. 1, other reflective surfaces can also or instead be used to determine a degraded state. For instance, the sensor testing component 106 can receive sensor data (e.g., lidar data) from a reflective surface of a retroreflector or other reflective surface (e.g., a Lambertian surface). In various examples, the retroreflector can represent a road marker on a side of a roadway, a centerline marker, a reflector associated with an object (e.g., a pedestrian, a vehicle, a bicycle, etc.), a windshield, a window of a static object, such as a building, just to name a few. For example, a window can reflect light depending upon weather, time of day, and other factors, and the sensor testing component 106 can receive sensor data associated with the window, and compare the sensor data (an amount of light, an intensity value, pulse information, etc.) to a baseline that is determined with consideration to expected sensor data given the weather, time of day, etc. In this way, the sensor testing component 106 can use known locations of reflective surfaces to determine whether the lidar sensor 108 is operating properly (is not obstructed).

The sensor testing component 106 can determine a baseline for comparing to the received sensor data in a variety of ways. For example, a baseline component (not shown) can determine baseline data based at least in part on environmental data (e.g., time of day, ambient light, weather, etc.), a retroreflector type, distance data representing a distance between the lidar sensor 108 and the retroreflector, vehicle data (e.g., orientation, velocity, pose, etc.) associated with the vehicle 102, sensor data for one or more sensors, sensor transmission power (e.g., transmission power of a lidar beam emitted from a lidar sensor), azimuth data, elevation data, pulse data, historical degradation data, etc. In some examples, the baseline data can account for an angle of arrival of the sensor data such that expected reflectivity values for a particular angle of arrival, distance, retroreflector type, and so on, is taken into account during comparison between the sensor data and the baseline data. Further description of determining baseline data is found throughout this disclosure, including in FIG. 3.

Heuristics, a mathematical algorithm, and/or machine learned techniques can be employed by the sensor testing component 106 to determine a difference between the sensor data and the baseline data. In some examples, the sensor testing component 106 can determine a degraded state for the lidar sensor 108 representing a level of performance relative to an expected operational state based at least in part on the difference. The degraded state can be associated with a confidence level indicating a confidence in the degraded state value (e.g., a larger difference can reflect a higher confidence that the lidar sensor has degraded over time). In some examples, the confidence level can be adjusted based on additional sensor data from another sensor and/or sensor data associated with a different time. For example, the confidence level can be verified if another lidar sensor other than the lidar sensor 108 also detected lower than expected reflectivity values from a retroreflector or reduced if the other lidar sensor does not detect similar reflectivity values as the lidar sensor 108. Additional details of determining sensor degradation are described in U.S. patent application Ser. No. 16/728,910, filed Dec. 27, 2019, entitled "Sensor Degradation Monitor," which is incorporated herein by reference in its entirety and for all purposes.

In some examples, the confidence level of the degraded state can be determined based at least in part on a number of tests performed, previous degraded state values, a field of view associated with the sensor data, image data or other sensor data confirming presence of the retroreflector, etc. For example, a confidence level may be assigned to the degraded state in examples that another sensor and/or other tests are associated with similar reflected light "signatures" represented by the sensor data (e.g., a higher confidence value when image data confirms presence of the retroreflector and a lower confidence value when the image data does not include the retroreflector.).

The degraded state determined by the sensor testing component 106 can correlate to a level of obstruction on an outer surface (e.g., a lens) of the lidar sensor 108. For instance, mud, animal droppings, a sticker, or other obstruction on the lidar sensor 108 can be detected by the sensor testing component 106 based at least in part on one or more additional tests.

The sensor testing component 106 can, for instance, determine an action for the vehicle 102 based at least in part on comparing the degraded state to a degradation threshold representing a minimal safety level for operating the lidar sensor 108. In various examples, the sensor testing component 106 can initiate a cleaning operation, a maintenance operation, a trajectory for the vehicle 102 to use to navigate in the environment 100, or other actions as described herein. As a non-limiting example, a communication to a remote computing device that initiates replacement of the lidar sensor 108 can be performed in examples when the degraded state meets or exceeds the degradation threshold.

As mentioned, the vehicle computing device 104 can receive map data representing the environment 100 and determine a location(s) of one or more retroreflectors based at least in part on the map data. In some examples, the sensor testing component 106 can be configured to generate a communication for sending to a map component (e.g., map(s) 530 of FIG. 5) to cause a position of a retroreflector to be updated in the map data. For example, if sensor data determines that a retroreflector no longer exists, or has changed position (e.g., a road marker is replaced at a new location), then the map data can be updated so that future tests are initiated at a correct distance from the retroreflector. In various examples, the vehicle computing device 104 can update the map data based at least in part on image data or other sensor data gathered during navigation of the vehicle 102 (or another vehicle in a fleet of vehicles). By way of example and not limitation, one or more sensors of one or more vehicles can determine a position of a retroreflector in a coordinate system, and send the position information to a computing device configured to maintain the positions of retroreflectors (e.g., a vehicle computing device or computing device remote from the vehicle). Based on a number of detections of the retroreflector from different sensor modalities, for instance, the computing device can maintain a map that includes positions of the retroreflector for use by the sensor testing component 106.

Figure 2:
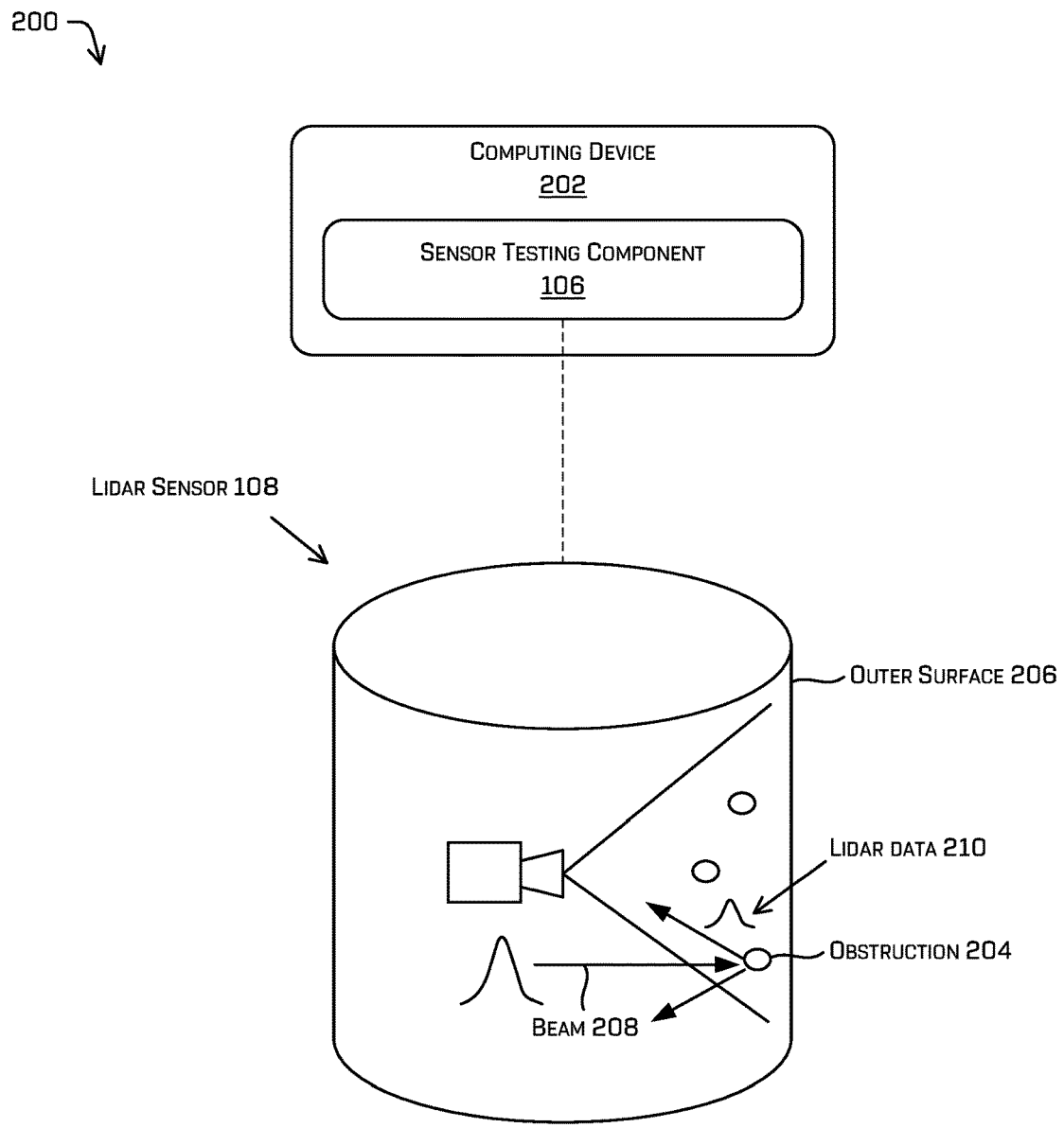
FIG. 2 is a pictorial diagram illustrating an example implementation to detect an obstruction associated with an example sensor.

FIG. 2 is a pictorial diagram illustrating an example implementation 200 to detect an obstruction associated with an example sensor. For instance, a computing device 202 can implement the sensor testing component 106 to detect an obstruction 204 on an outer surface 206 of the lidar sensor 108. In some examples, the computing device 202 can be associated with a test environment or a robotic device such as an autonomous vehicle navigating in an environment (e.g., the vehicle computing device 104).

Generally, the sensor testing component 106 can analyze sensor data relative to a baseline to identify "signatures" of different obstruction types. The sensor testing component 106 can, for example, determine whether intensity and/or pulse information associated with the sensor data is different from expected intensity and/or pulse information associated with the baseline data. In various examples, a traffic sign can be associated with a different baseline (e.g., expected reflectivity data) than a lane marker of a roadway (or another retroreflector). The baseline can be based on data collected over time that represents expected reflectivity data for a retroreflector in a variety of environmental conditions (e.g., different weather, ambient light, time of day, etc.), vehicle states (e.g., pose, orientation, velocity, trajectory, etc. of the vehicle 102), and/or states of the lidar sensor 108 (e.g., orientation, beam exit angle, azimuth, elevation, etc.). Such information about the retroreflector may be associated with the map and/or otherwise made available to the sensor testing component 106. For example, a retroreflector can be determined from a position of known retroreflector included in the map that identifies street signs, street lights, markers, etc.) while in other examples a retroreflector determination can be based at least in part on point cloud data such as intensity values above an intensity threshold such as intensity values above 230 in a scale up to 255 (as a non-limiting example). In some examples, the retroreflector can be identified based on a shape and intensity values in the point cloud data (e.g., a stop sign can be identified based on intensity values within a boundary of the stop sign and a hexagon shape of the stop sign).

The sensor testing component 106 can receive sensor data from one or more sensors (e.g., the lidar sensor 108) and determine presence of a retroreflector based at least in part on the sensor data. In some examples, the retroreflector may not have been previously detected (not associated with a map or previously known location), and intensity information represented by the sensor data can be compared to an intensity threshold to determine the retroreflector in the environment (e.g., detect a retroreflector coupled to an object such as a sticker or reflector on a bicycle, backpack, or person such as an emergency worker wearing a jacket with reflective material for safety, just to name a few). The sensor testing component 106 can determine a degraded state for the one or more sensors based at least in part on comparing intensity information associated with the retroreflector to the intensity threshold (e.g., a sensor is degraded if the intensity information is below the intensity threshold.

In various examples, the lidar sensor 108 can generate a beam 208 for transmission into the environment, and the transmission can be affected by the obstruction 204 (e.g., foreign particle(s) on the lidar sensor). In some examples, the sensor testing component 106 can receive lidar data 210 representing beam and/or pulse information detected at substantially zero distance (on or within several centimeters) from the outer surface 206 (e.g., the lens) of the lidar sensor 108, and implement one or more heuristics to the lidar data 210 (e.g., lidar point cloud data and/or raw lidar data not associated with a point cloud). In various examples, the lidar data 210 can, for example, represent raw lidar data that has not been post-processed (or otherwise filtered) by the lidar sensor 108. That is, data captured by the lidar sensor 108 that is free of modifications caused by a processor associated with the lidar sensor 108 can be sent from the lidar sensor 108 to the sensor testing component 106. By not post-processing data captured by the lidar sensor 108, raw lidar data representing areas close to the outer surface can be available for processing by the sensor testing component 106. In various examples, such raw data may be associated with a detected received power per unit time. Generally, the raw lidar data can represent data captured by the lidar sensor 108 prior to being converted to lidar point cloud data, or other processed lidar data. However, in other examples, the lidar data 210 can include point cloud information representing intensity data representing an amount of light reflected by the retroreflector.

In some examples, the sensor testing component 106 can determine the degraded state of the lidar sensor 108 based on comparing the lidar data 210 associated with different output power, distances, and/or times. For instance, the sensor testing component 106 can determine the degraded state representing the degree of obstruction for the lidar sensor 108 based at least in part on comparing lidar data received from a retroreflector at different distances from the outer surface 206.

The sensor testing component 106 can also or instead determine a size and/or a location of the obstruction 204 on the outer surface 206, and degraded state can further represent the size and/or the location of the obstruction 204. To determine the size and/or the location (or region) of the obstruction 204, the sensor testing component 106 can determine the degraded state based on comparing angle information, spatial information, and the like associated with the lidar data 210 to baseline data. The angle information can represent different angles of emission for one or more beams leaving the lidar sensor 108. The spatial information can represent an x-coordinate, y-coordinate, z-coordinate, or other positional data, associated with one or more beams emitted from the lidar sensor 108. As a non-limiting example, in a rotating lidar, the degradation may be associated with only a particular angle (or range of angles). In such an example, the obstruction may be determined based on the angle (or range). Further, in those examples in which the lidar has multiple channels (e.g., azimuthal angles), the location of the obstruction may further be determined based at least in part on the channels which are associated with the degradation.

The output from the sensor testing component 106 can identify a characteristic (e.g., severity, transparency, size, shape, etc.) of the obstruction 204, and one or more actions can be initiated by the sensor testing component 106 can determine the degraded state based at least in part on the characteristic of the obstruction 204. For example, the sensor testing component 106 can cause a cleaning system to clean the lidar sensor 108 at the identified location of the obstruction, cause the vehicle 102 to navigate to a safe location, cause the vehicle to receive assistance from a teleoperator (e.g., a remote computing device), alter a setting of the lidar sensor 108 (e.g., increase power output and/or reduce reliance on the lidar sensor 108 in favor of other available sensors, etc.). Performing the one or more actions based at least in part on the output from the sensor testing component 106 is discussed throughout this disclosure.

In various examples, an output from the sensor testing component 106 can be used to initiate a cleaning operation to remove the obstruction 204 from the outer surface 206 of the lidar sensor 108 and/or compensate for the obstruction 204. The cleaning operation can be mechanical, such as when using air or water cleaning solutions, and/or filter based such as when modifying a control policy and/or operating parameter of the lidar sensor 108. Thus, the cleaning operation can include removing some or all of the obstruction 204 and/or removing artifacts during processing of the lidar sensor 108. For example, the degraded state can be compared to a degradation threshold, and the cleaning operation can be initiated by the sensor testing component 106 when the degraded state meets or exceeds the degradation threshold. The degradation threshold can be determined based on an impact to operation of the lidar sensor 108 (e.g., a value at which the lidar sensor performance degrades below a pre-determined amount).

The obstruction 204 can include one or more of: rain, mud, dirt, dust, snow, ice, animal droppings, cloth, plastic, sticker, and so on. Different types of obstructions can be associated with different pulse information, intensity information, and so on, such that the sensor testing component 106 can be trained to classify a type of obstruction on the outer surface 206. Pulse information and/or intensity information can be different for rain, snow, mud, and other obstruction types. By applying heuristics and/or a machine learned model to the lidar data 210 (or raw lidar data), the sensor testing component 106 can determine a classification of the obstruction 204, and an action can be initiated based on the classification. For example, a classification that the obstruction 204 is mud or animal droppings can result in initiating a cleaning operation to remove the obstruction whereas a classification of rain can result in increasing power output of the lidar sensor 108 or the computing device 202 relying more heavily on other available sensors.

Using the techniques described herein, actions can be performed to detect and/or mitigate backscattering (and the problems associated therewith) caused by the obstruction 204. For example, the degraded state of the lidar sensor 108 can cause the computing device 202 to change power output by the lidar sensor 108, determine a level of confidence in data received from the lidar sensor 108, or initiate cleaning of the outer surface 206.

Figure 3:
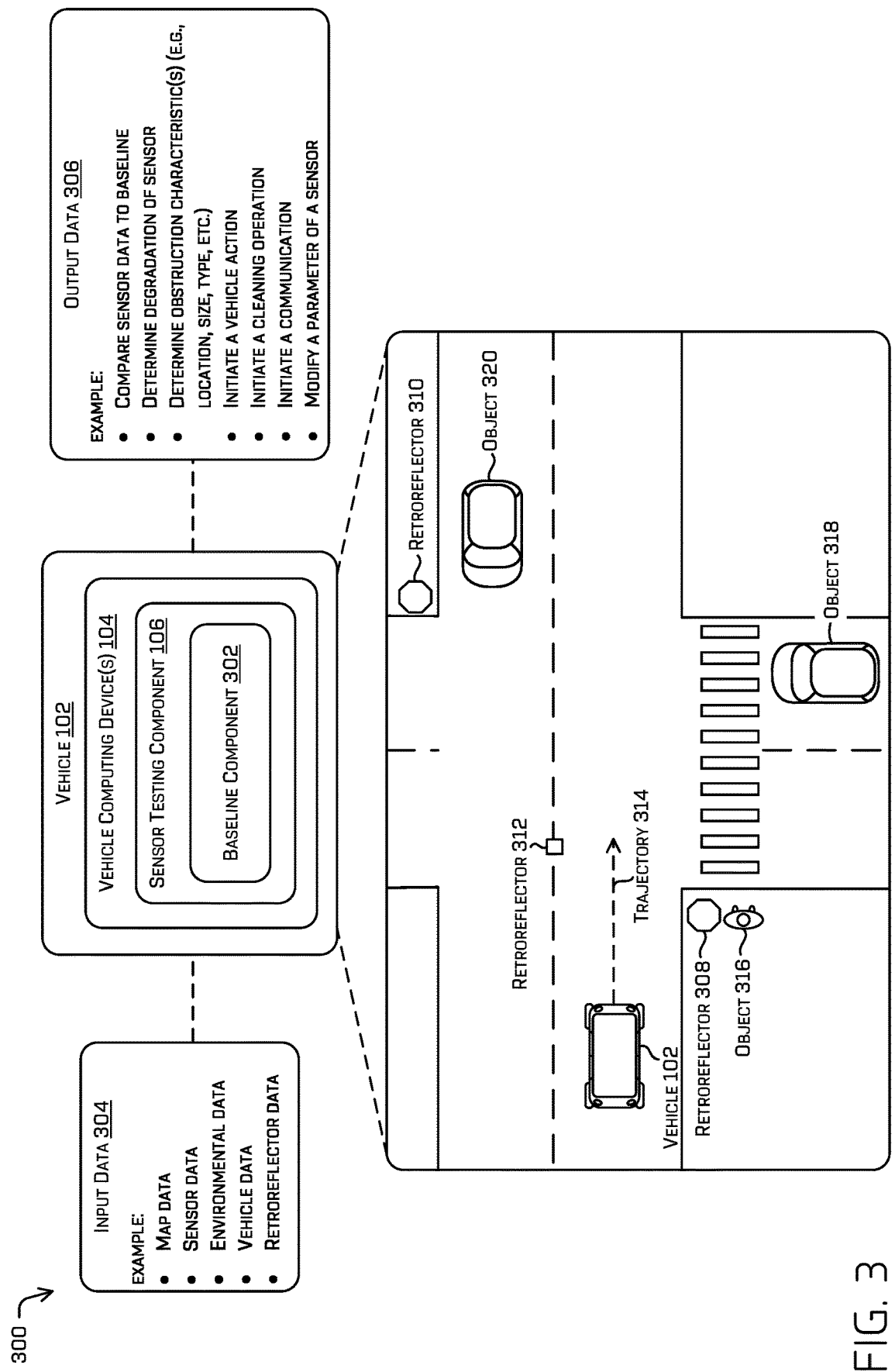
FIG. 3 is an illustration of another example environment in which an example vehicle computing device determines sensor degradation based on data associated with a retroreflector.

FIG. 3 is an illustration of another example environment 300 in which an example vehicle computing device determines sensor degradation based on data associated with a retroreflector. For instance, the vehicle 102 includes the one or more vehicle computing device(s) 104 to navigate in the environment 300. In various examples, the vehicle 102 can represent a bi-directional autonomous vehicle. The vehicle computing device(s) 104 (also referred to the vehicle computing device 104) can include the sensor testing component 106 which further includes a baseline component 302 to implement the degradation detection techniques described herein. In some examples, the vehicle 102 may be configured like vehicle 502 of FIG. 5, and the vehicle computing device 104 may be configured like vehicle computing device(s) 502 of FIG. 5.

In some examples, vehicle computing device 104 can receive sensor data from one or more sensor system(s) that include one or more of: a location sensor, a lidar sensor, a radar sensor, a camera, an inertial sensor, an environmental sensor, an audio sensor, and/or a time-of-flight sensor, just to name a few. For instance, the sensor testing component 106 can receive sensor data captured by the one or more sensor system(s) usable to identify, detect, or otherwise determine an obstruction(s) associated with one or more sensor system(s). By applying heuristics and/or a machine learned model to sensor data received from the one or more sensor system(s), the sensor testing component 106 can detect an obstruction (e.g., the obstruction 204) on a lidar sensor, or other sensor, coupled to the vehicle 102.

The sensor testing component 106 can represent functionality to determine degradation of a sensor (relative to as calibrated for initial use) based at least in part on sensor data captured by the sensor in a vicinity of a retroreflector (also referred to as reflectivity data). The sensor testing component 106 can receive and/or transmit data between the sensor system(s) as well as other components of the vehicle computing device 104. For instance, the sensor testing component 106 can receive input data 304 from one or more sensors and generate output data 306 for transmitting to one or more components of the vehicle computing device 104.

The baseline component 302 can represent functionality to determine baseline data for comparing with the received sensor data from the one or more sensor system(s). For example, the baseline component 302 can determine a baseline for a retroreflector in the environment, such as a traffic sign (retroreflector 308 and retroreflector 310), a centerline marker (retroreflector 312), or other retroreflector types. The baseline determination can be based at least in part on a distance at which the sensor captures sensor data from the retroreflector, environmental data, vehicle data, sensor data for one or more sensors, transmission power of a lidar beam emitted from a lidar sensor, azimuth data, elevation data, pulse data, historical degradation state data, reflective data associated with a surface of an autonomous vehicle, raw sensor data, and/or an angle of return data associated with the sensor data. For instance, determining presence of a retroreflector can be based at least in part on sensor data representing intensity values above an intensity threshold and/or map data that includes positions of previously detected retroreflectors. In some examples, the baseline component 302 can determine the baseline data based at least in part on receiving a list of environmental conditions, vehicle conditions, and so on during which sensor data is captured in association with the retroreflector. In this way, the baseline data can be specific for each sensor test.

The input data 304 can include one or more of: map data, sensor data, environmental data, vehicle data, retroreflector data, and so on. For example, the input data can include map data usable for determining a location of a retroreflector such as a traffic sign (the retroreflector 308 and the retroreflector 310) and a centerline marker (the retroreflector 312), though other retroreflector types are also contemplated. The input data 304 can also include sensor data from one or more sensors received as the vehicle 102 navigates and/or responsive to performing a test (e.g., initiating a test when the vehicle 102 is a threshold distance from one of the retroreflectors). In various examples, the input data 304 can represent a pose, orientation, or other data associated with the vehicle 102 and/or the sensor being tested. Retroreflector data representing characteristics of the retroreflector (e.g., a retroreflector identifier, a retroreflector type, historical degraded state information, a type of reflective surface, etc.).

As mentioned, the sensor testing component 106 can generate the output data 306 based at least in part on the input data 304. The sensor testing component 106 can apply an algorithm, heuristic, and/or machine learned model to the input data 304 to determine the output data 306 representing: compared sensor data and baseline data, a degree of degradation of a sensor, an obstruction characteristic (e.g., a location, size, classification, etc.) associated with an outer surface of a sensor, a communication to initiate a vehicle action, a communication to initiate a cleaning operation, a communication to modify a parameter of a sensor, among others.

The vehicle 102 can perform various actions based at least in part on the output data 306. For instance, the sensor testing component 106 can generate a communication for sending to a planning component to cause the planning component to determine a trajectory 314 for the vehicle 102 to follow in the environment. The trajectory 314 (e.g., direction, speed, acceleration, etc.) can enable the vehicle 102 to avoid static and/or dynamic objects such as a pedestrian (object 316) and other vehicles (e.g., object 318 and object 320). The output data 306 can also or instead be used by the vehicle computing device 104 to determine a position, a pose, a velocity, etc., of the vehicle 102. Potential actions by the vehicle 102 are further described in relation to FIG. 5, and elsewhere.

In some examples, the output data 306 can represent a degraded state value usable to control an autonomous vehicle (e.g., determine the trajectory 314 for vehicle 102), modify perception operations to reduce reliance on the sensor that is obstructed, operate the vehicle 102 in one direction, pull the vehicle 102 over, initiate a communication to a remote operator for assistance, etc. For example, controlling the autonomous vehicle in the environment can comprise determining a direction of travel for the autonomous vehicle based at least in part on a location of the lidar sensor (or another sensor) on the autonomous vehicle. By implementing the techniques described herein, safety of the autonomous vehicle can be improved by performing an action that mitigates an obstruction of a sensor used for "seeing" an environment (e.g., detection of objects can be improved to enable the vehicle to navigate more safely).

Figure 4A:
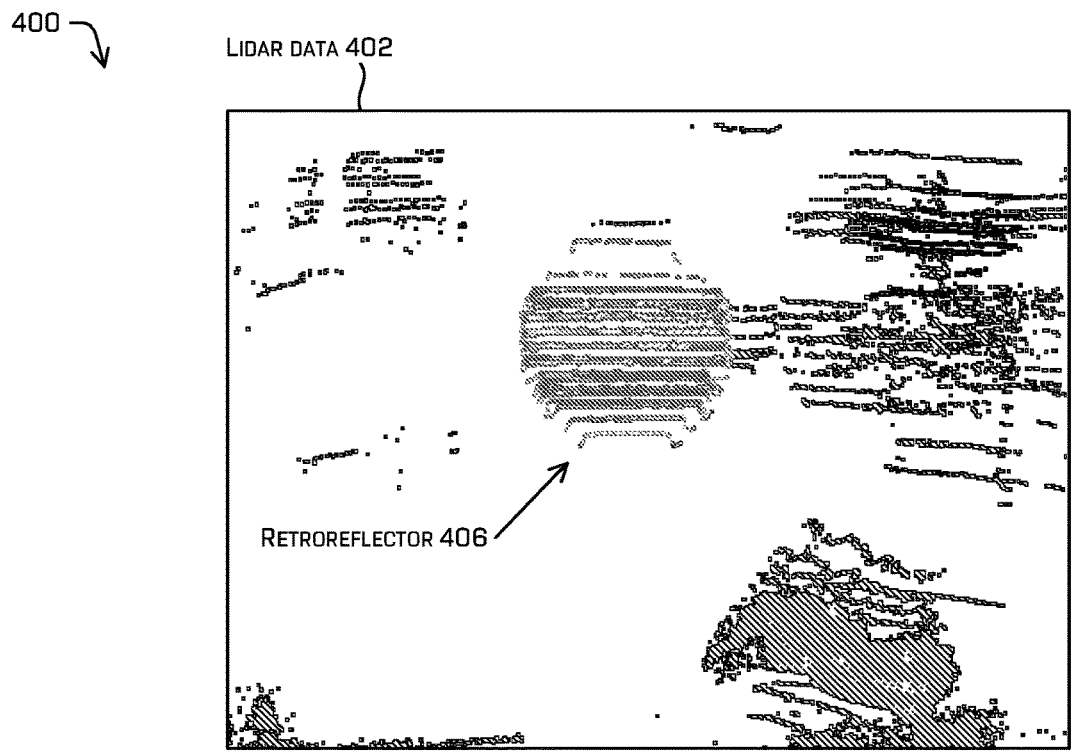
FIG. 4A is a pictorial diagram illustrating a first part of an example implementation to detect a degraded state of an example sensor based on sensor data associated with a retroreflector.
Figure 4A:
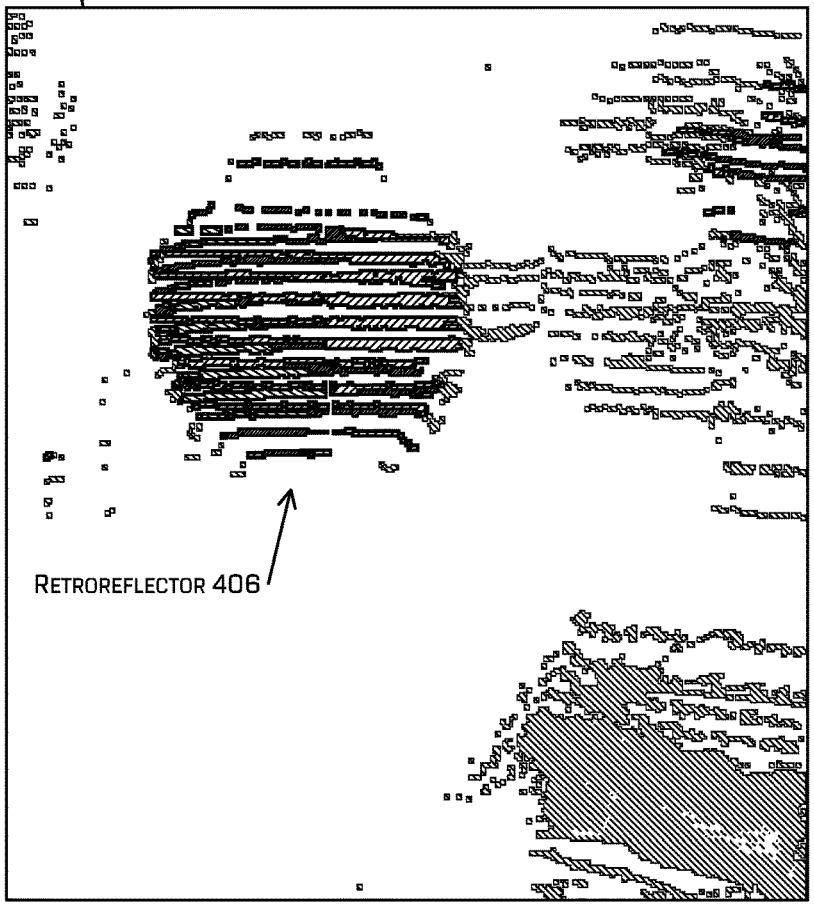

FIG. 4A is a pictorial diagram illustrating a first part of an example implementation 400 to detect, predict, generate, or otherwise determine a degraded state of an example sensor based on sensor data associated with a retroreflector. For instance, the computing device 202 can employ the sensor testing component 106 to receive lidar data 402 and/or lidar data 404 representing an environment of a lidar sensor (e.g., the lidar sensor 108). The lidar data 402 can be associated with a different time, distance, and/or obstruction than the lidar data 404. As shown in FIG. 4A, the lidar data 402 and the lidar data 404 are associated with a same retroreflector (retroreflector 406).

Generally, the lidar data 402 and the lidar data 404 represent lidar point cloud data (e.g., lidar returns) resultant from the lidar sensor 108 sending one or more beams into the environment. The lidar sensor 108 can emit multiple beams at different angles into the environment to generate the lidar data representing one or more objects including the retroreflector 406. Data points represented by the lidar data can include intensity values that represent light reflected from different surfaces in the environment. The retroreflector 406 can, for instance, include a reflective surface, and light from the beam(s) reflected off the reflective surface can be considered reflectivity data associated with the retroreflector 406. For illustrative purposes, the lidar data 402 and the lidar data 404 in FIG. 4A represent a portion of the environment that includes the retroreflector 406 (e.g., a 90-degree view of a 360-degree lidar scan)

In some examples, the sensor testing component 106 can determine a degraded state for the lidar sensor 108 based at least in part on a difference between the lidar data 402 (and/or the lidar data 404) and baseline data. For example, an amount of reflected light from the retroreflector 406 can be compared to an amount of expected reflected light from the retroreflector 406. The baseline data can account for environmental conditions (e.g., weather, ambient light, time of day, etc.), vehicle conditions (e.g., pose, position, velocity, etc.), and/or characteristics of the lidar sensor 108 (e.g., emitted beam angle, angle of arrival, azimuth, elevation, etc.). That is, the baseline component 302 can determine the baseline data based on conditions present when the lidar sensor 108 sends the one or more beams into the environment.

The lidar data 402 and the lidar data 404 can include multiple data points and each data point can be associated with an intensity, position, azimuth, as well as other information. In some examples, the sensor testing component 106 can determine the difference between the lidar data 402 and the baseline data by comparing intensity values of data points in the lidar data 402 to intensity values represented by the baseline data. For example, the intensity value may range from 0-255 with higher values being associated with greater intensity. In FIG. 4A, darker shading corresponds to higher intensity values. The lidar data 402 can include lower intensity values (lighter overall shading in an area of the retroreflector 406 than the lidar data 404). This may be caused by a first obstruction of the lidar sensor 108 having lower transparency for the lidar data 402 versus a second obstruction on the lidar sensor 108 when the lidar data 404 was captured. Alternatively, the intensity values for the lidar data 402 may be less than those of the lidar data 404 because the lidar sensor 108 was at a greater distance from the retroreflector 406 (relative to the lidar data 404) when the lidar data 402 was captured.

In some examples, the lidar data 402 and the lidar data 404 can represent lidar point cloud data or raw lidar data captured at different times. For instance, the lidar data 402 can be associated with a first time and the lidar data 404 can be associated with a second time after the first time. In various examples, the lidar data 402 and the lidar data 404 can, for example, be received from one or more lidar sensors as the vehicle 102 navigates in the environment. Accordingly, the lidar data 404 can be associated with a sensor that changed position in the environment (moved closer or further from the retroreflector 406 due to a vehicle trajectory, velocity, etc.).

Though described as being associated with the lidar sensor 108, the lidar data 402 and the lidar data 404 can, in some examples, be associated with different lidar sensors. For example, the lidar data 402 and the lidar data 404 can be captured at a same time from different lidar sensors, and based at least in part on respective comparisons to baseline data, one or both of the lidar data 402 and the lidar data 404 can be associated with a degraded state. In various examples, the sensor testing component 106 can compare the lidar data 402 to the lidar data 404 to identify degradation of a lidar sensor. In such examples, the sensor testing component 106 can determine the degraded state of the lidar sensor independent of comparing the lidar data to baseline data and/or to map data indicating a position of the retroreflector.

FIG. 4B is a pictorial diagram illustrating a second part of an example implementation 400 to detect a degraded state of an example sensor based on sensor data associated with a retroreflector. For instance, the computing device 202 can receive lidar data associated with the lidar sensor 108 and detect degradation cause by an obstruction based at least in part on comparing the lidar data (one of lidar data 408 or lidar data 410) to expected lidar data (e.g. baseline data).

FIG. 4B depicts lidar data with higher intensity values compared to the lidar data of FIG. 4A (e.g., darker shading in a region of the retroreflector 406). The lidar data 408 can include reflectivity data associated with the retroreflector 406. Presence of an obstruction on an outer surface of the lidar sensor 108 can be determined by comparing information associated with the lidar data 408 (and/or the lidar data 410) to information associated with baseline data. As a result, the computing device 202 can determine that the lidar sensor is associated with an obstruction that allows at least some of the beams to transmit through the obstruction and to the retroreflector 406. For example, the sensor testing component 106 can determine that the degraded state is likely caused by tape or a sticker on the outer surface of the lidar sensor 108 whereas lower intensity values, such as those associated with the lidar data 402 may be due to mud, animal droppings, or other obstruction.

In some examples, the sensor testing component 106 can determine whether a lack of data points or datapoints having relatively low intensity is caused by an obstruction or an error in capturing the lidar data (e.g., due to an uncalibrated lidar sensor). For instance, a field of view of another lidar sensor, radar sensor, image sensor, etc., can be used to confirm whether the lidar sensor 108 requires calibration or is associated with a degradation caused by an obstruction on and/or near a lens of the lidar sensor.

In some examples, lidar data captured at different times and/or captured at different distances from a retroreflector can be combined (e.g., averaged, aggregated, etc.) to determine the degraded state. For example, intensity data associated with the lidar data 402, the lidar data 404, the lidar data 408, and/or the lidar data 410 can be averaged across an area of the retroreflector 406. In some examples, the lidar data 402, the lidar data 404, the lidar data 408, and/or the lidar data 410 can represent lidar values in three dimensions (e.g., x, y, and z space) such that the intensity values are associated with a z-axis. The three dimensions can represent how intensity is distributed across a surface of the retroreflector 406, and the sensor testing component 106 can compare the distribution information to baseline distribution information to determine a degree of similarity between the intensity distribution and the baseline distribution.

Figure 5:
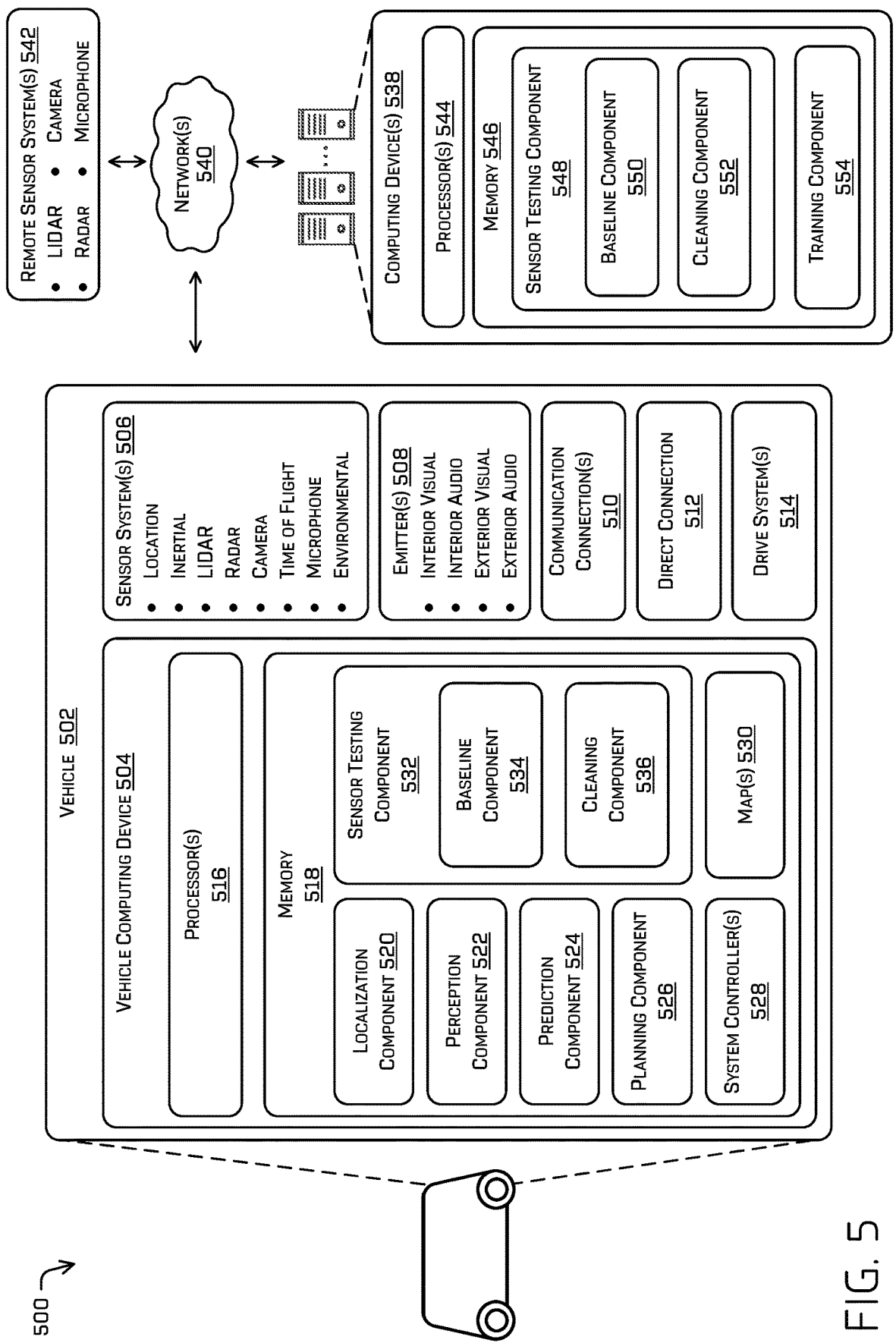
FIG. 5 is a block diagram of an example system for implementing the techniques described herein.

FIG. 5 is a block diagram of an example system 500 for implementing the techniques described herein. In at least one example, the system 500 can include a vehicle 502. In the illustrated example system 500, the vehicle 502 is an autonomous vehicle; however, the vehicle 502 can be any other type of vehicle.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 540 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a localization component 520, a perception component 522, a prediction component 524, a planning component 526, one or more system controllers 528, one or more maps 530, and a sensor testing component 532 including a baseline component 534, and a cleaning component 536. Though depicted as residing in the memory 518 for illustrative purposes, it is contemplated that the localization component 520, the perception component 522, the prediction component 524, the planning component 526, the one or more system controllers 528, the one or more maps 530, the sensor testing component 532, the baseline component 534, and the cleaning component 536 may additionally, or alternatively, be accessible to the vehicle 502 (e.g., stored on, or otherwise accessible by, memory remote from the vehicle 502, such as, for example, on memory 546 of a remote computing device 538).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530 and/or a remote map component, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 524 can generate one or more probability maps representing prediction probabilities of possible locations of one or more objects in an environment. For example, the prediction component 524 can generate one or more probability maps for vehicles, pedestrians, animals, and the like within a threshold distance from the vehicle 502. In some instances, the prediction component 524 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 524 may generate predicted trajectories of objects (e.g., objects) in an environment and/or to generate predicted candidate trajectories for the vehicle 502. For example, the prediction component 524 may generate one or more predicted trajectories for objects within a threshold distance from the vehicle 502. In some examples, the prediction component 524 may measure a trace of an object and generate a trajectory for the object based on observed and predicted behavior.

In general, the planning component 526 may determine a path for the vehicle 502 to follow to traverse through an environment. For example, the planning component 526 may determine various routes and trajectories and various levels of detail. For example, the planning component 526 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 526 may generate an instruction for guiding the autonomous vehicle along at least a portion of the route from the first location to the second location. In at least one example, the planning component 526 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 526 can select a trajectory for the vehicle 502 (e.g., the trajectory 314) based at least in part on receiving data representing an output of the sensor testing component 532 (e.g., the output data 306).

In other examples, the planning component 526 can alternatively, or additionally, use data from the localization component 520, the perception component 522, and/or the prediction component 524 to determine a path for the vehicle 502 to follow to traverse through an environment. For example, the planning component 526 can receive data from the localization component 520, the perception component 522, and/or the prediction component 524 regarding objects associated with an environment. Using this data, the planning component 526 can determine a route to travel from a first location (e.g., a current location) to a second location (e.g., a target location) to avoid objects in an environment. In at least some examples, such a planning component 526 may determine there is no such collision free path and, in turn, provide a path which brings vehicle 502 to a safe stop avoiding all collisions and/or otherwise mitigating damage. Additionally or alternatively, the planning component 526 can determine the path for the vehicle 502 to follow based at least in part on data received from the sensor testing component 106 as described in FIGS. 1-4B and elsewhere.

In at least one example, the vehicle computing device 504 may include one or more system controllers 528, which may be configured to control steering, propulsion, braking, safety, emitters, communication, and other systems of the vehicle 502. The system controller(s) 528 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 524, and/or the planning component 526 to determine a location of the vehicle 502, detect objects in an environment, generate routes, determine actions and/or trajectories to navigate within an environment.

In some examples, the one or more maps 530 may be used by the sensor testing component 532 or the sensor testing component 548 to identify a location (e.g., a position in a coordinate system) of a retroreflector in the environment. For instance, the vehicle 502 can detect intensity values for an area in the environment that are above an intensity threshold (e.g. above 230 in a lidar intensity scale up to 255), and assign the area associated with the intensity values with a retroreflector. In some examples, intensity values from two or more sensors can be used to confirm presence of a retroreflector. Additional details of generating a map are described in U.S. patent application Ser. No. 15/927,806, filed Mar. 21, 2018, entitled "Generating Maps Without Shadows," which is incorporated herein by reference in its entirety and for all purposes.

In some examples, the one or more maps 530 may be stored on a remote computing device(s) (such as the computing device(s) 538) accessible via network(s) 540. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

As illustrated in FIG. 5, the vehicle computing device 504 may include the sensor testing component 532 configured to perform the functionality of the sensor testing component 106, including detecting a degraded state caused by an obstruction on or near a sensor of the sensor system(s) 506. In various examples, the sensor testing component 532 may receive sensor data, vehicle data, and the like from the perception component 522 and/or from the sensor system(s) 506. In some examples, the sensor testing component 532 may receive environment characteristics (e.g., environmental factors, etc.) and/or weather characteristics (e.g., weather factors such as snow, rain, ice, etc.) from the perception component 522 and/or the sensor system(s) 506. While shown separately in FIG. 5, the sensor testing component 532 could be part of the prediction component 524, the planning component 526, or other component(s) of the vehicle 502.

In various examples, the sensor testing component 532 can analyze the sensor data to determine if an individual sensor of the vehicle 502 is faulty or otherwise behaving abnormally. For instance, the sensor testing component 532 can determine presence of an obstruction (e.g., water, dirt, snow, plastic, cloth, etc. covering at least a portion of a sensor (or region in front of the sensor) based at least in part on analyzing intensity information and/or pulse information included in the sensor data. In examples when an obstruction is detected on or near an outer surface of the sensor, the sensor testing component 532 can perform an action (e.g., initiate a cleaning operation to remove the obstruction from the sensor, control the vehicle 502, adjust a parameter of the sensor, generate a communication that initiates calibration or maintenance, and so on).

In some examples, the sensor testing component 532 can analyze the sensor data to determine characteristics associated with an obstruction of a sensor. For example, the sensor testing component 532 can determine a size, a location, and/or a type of obstruction associated with the sensor. In some examples, the baseline component 534 can determine a degraded state associated with the lens of the sensor relative to a calibrated state, and perform the action based at least in part on the characteristics and/or the degraded state.

The baseline component 534 can include functionality to determine baseline data for comparing to received sensor data. The baseline component 534 can, for instance, include at least the functionality of the baseline component 302 including selection of a baseline from available baselines associated with different characteristics. For instance, lidar data can be compared with baseline data having similar environmental, vehicle, and/or sensor characteristics as those during capture of the lidar data by a lidar sensor.

The cleaning component 536 can include functionality to clean a sensor to remove an obstruction. For instance, the cleaning component 536 can cause air, water, or types of cleaning to remove the obstruction at a location on the sensor.

In some examples, the vehicle 502 may send sensor data to the computing device(s) 538 via the network(s) 540. In some examples, the vehicle 502 may receive sensor data from the computing device(s) 538 and/or remote sensor system(s) 542 via the network(s) 540. The sensor data may include raw sensor data and/or processed sensor data and/or representations of sensor data. In some examples, the sensor data (raw or processed) may be sent and/or received as one or more log files. In one example, the sensor data can correspond to the lidar data 210 and can include historical obstruction scores for one or more sensors.

The computing device(s) 538 may include processor(s) 544 and a memory 546 storing a sensor testing component 548, a baseline component 550, and a cleaning component 552, and a training component 554. In various examples, the sensor testing component 548 may be configured to receive data from one or more remote sensors, such as the sensor system(s) 506 and/or remote sensor system(s) 542. In some examples, the sensor testing component 548 may be configured to process the data and send processed sensor data to the vehicle computing device 504, such as for use by the perception component 522, the prediction component 524, and/or the planning component 526. In some examples, the sensor testing component 548 may be configured to send calibration score data to the vehicle computing device 504.

The sensor testing component 548 can be configured to perform the functionality of the sensor testing component 106, including predicting a degraded state for a sensor coupled to the vehicle 502. For instance, a determination of an obstruction indicative of a degree of transparency for a lens of a sensor can be based at least in part on comparing sensor data to a baseline (e.g., comparing pulse information, intensity information, raw lidar data to expected values).

The baseline component 550 can include at least the functionality of the baseline component 302. For example, the baseline component 550 can process sensor data from one or more sensors of the sensor system(s) 506 to initiate an action to mitigate sensor degradation from a detected obstruction.

The cleaning component 552 can include functionality to clean one or more sensors of the sensor system(s) 506. For instance, the cleaning component 552 can include at least the functionality of the cleaning component 536 including generating a cleaning action directed to a portion of the sensor curve.

As can be understood, the components discussed herein (e.g., the sensor testing component 548, the baseline component 550, and the cleaning component 552) are described as divided for illustrative purposes. However, the operations performed by the various components may be combined or performed in any other component.

Determinations by the sensor testing component 532 and/or the sensor testing component 548 can be used by various components of the vehicle computing device 504. For example, obstruction scores associated with a sensor can be used to cause the vehicle 502 to take an action (e.g., a relatively low score can cause the vehicle to stop, pull over, etc., determine a maximum speed for the vehicle to operate, etc.) and/or cause a change in sensor contributions (e.g., a poorly operating sensor can contribute less to sensor fusion).

In some instances, the training component 554 can include functionality to train a machine learning model to output probabilities for whether pulse information is associated with an obstruction and/or a classification of an obstruction. For example, the training component 554 can receive sensor data that represents an obstruction (and optionally an obstruction type) and at least a portion of the sensor data can be used as an input to train the machine learning model.

In some instances, the training component 554 may be executed by the processor(s) 544 to train a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining an obstruction score associated with a lidar sensor and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 554 can include functionality to train a machine learning model to output classification values. For example, the training component 554 can receive data that represents labelled obstructions (e.g. publicly available data, sensor data, and/or a combination thereof). At least a portion of the data can be used as an input to train the machine learning model. Thus, by providing data where the vehicle traverses an environment, the training component 554 can be trained to output value(s) associated with obstructions on a lens of the sensor, as discussed herein.

In some examples, the training data can include point cloud data associated with a label indicating whether of the point cloud data is associated with a degraded state. In this way, the training component 554 can use the training data to predict a probability that sensor is degraded. In some examples, the point cloud data can be associated with a particular sensor of multiple available sensors on the vehicle 502 such that the labeled training data is specific for a specific sensor (a lidar sensor located at a particular position on the vehicle 502).

In some examples, the training component 554 can include training data that has been generated by a simulator. For example, simulated training data can represent examples of different obstruction types (e.g., plastic, dirt, snow, cloth, etc.), different retroreflector baseline data for a variety of test conditions, to provide additional training examples. Different degraded state values (e.g., obstruction scores) for a sensor can be simulated to determine an obstruction score threshold, or other threshold related to the sensor data (e.g., a pulse threshold, a transparency threshold, etc.).

While examples are given in which the techniques described herein are implemented by a detector component of the vehicle, in some examples, some or all of the techniques described herein could be implemented by another system of the vehicle, such as a secondary safety system. Generally, such an architecture can include a first computing device to control the vehicle 502 and a secondary safety system that operates on the vehicle 502 to validate operation of the primary system and to control the vehicle 502 to avoid collisions.

In some instances, aspects of some or all of the components discussed herein may include any models, techniques, and/or machine learned techniques. For example, in some instances, the components in the memory 518 (and the memory 546, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, 32opfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 516 of the computing device 504 and the processor(s) 544 of the computing device(s) 538 can be any suitable processor capable of executing instructions to process data and perform operations as described herein. By way of example and not limitation, the processor(s) 516 and the processor(s) 544 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 of the vehicle computing device 504 and the memory 546 of the computing device(s) 538 are examples of non-transitory computer-readable media. The memory 518 and the memory 546 can store an operating system and one or more software applications, instructions, programs, and/or data to implement the methods described herein and the functions attributed to the various systems. In various implementations, the memory 518 and 546 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Accordingly, the techniques discussed herein provide a robust implementation of determining a calibration score associated with a sensor to determine a level of accuracy of the sensor to allow the safe operation of an autonomous vehicle.

It should be noted that while FIG. 5 is illustrated as a distributed system, in alternative examples, components of the vehicle 502 may be associated with the computing device(s) 538 and/or components of the computing device(s) 538 may be associated with the vehicle 502. That is, the vehicle 502 may perform one or more of the functions associated with the computing device(s) 538, and vice versa.

Figure 6:
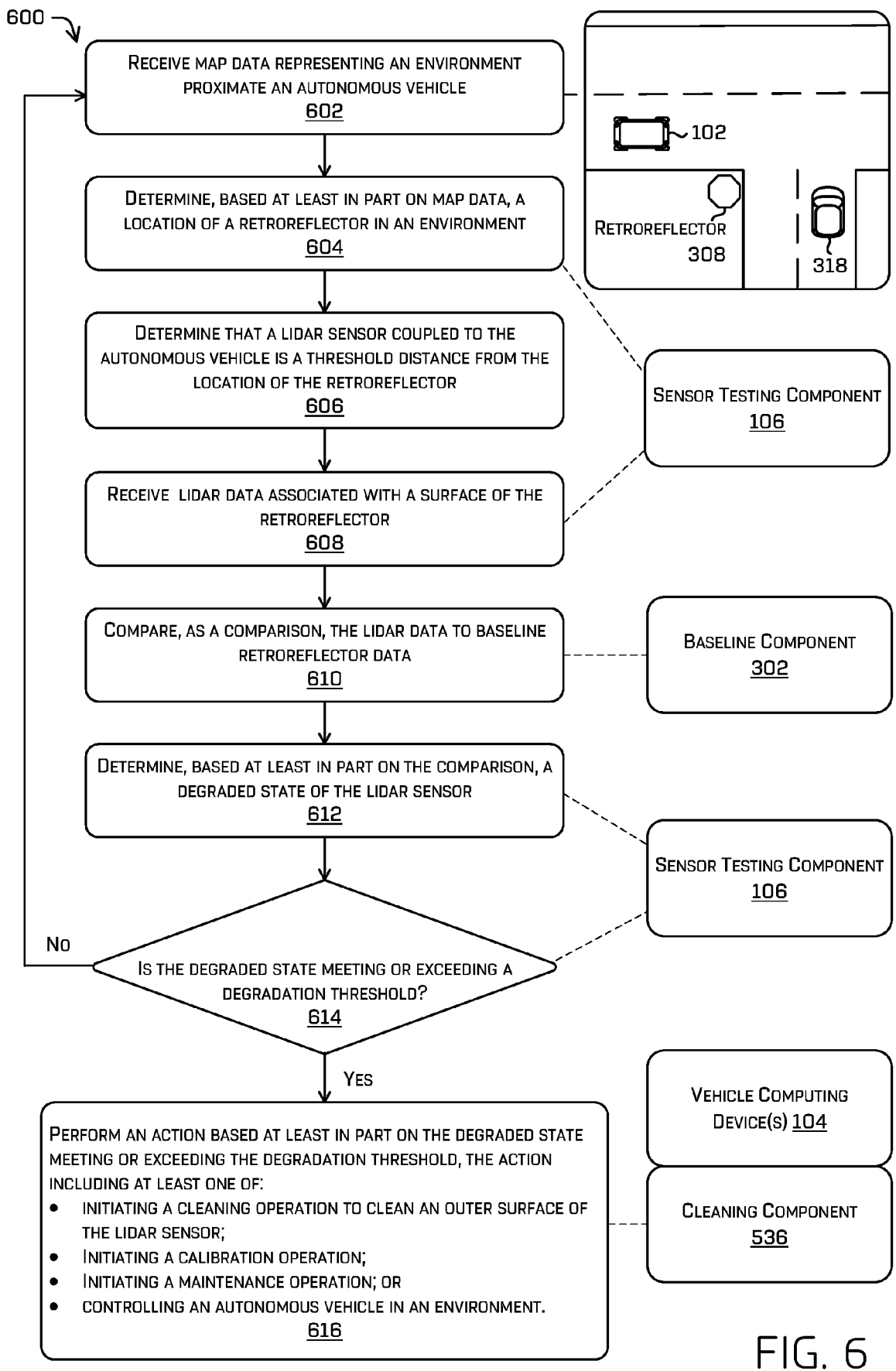
FIG. 6 is a flowchart depicting an example process for determining a degraded state of a lidar sensor using one or more example components.

FIG. 6 is an example process 600 for detecting an obstruction on a lens of a sensor using one or more example components. For example, some or all of the process 600 can be performed by one or more components in FIG. 5, as described herein. For example, some or all of the process 600 can be performed by the sensor testing component 106, the sensor testing component 532, and/or the sensor testing component 548.

At operation 602, the process can include receiving map data representing an environment proximate an autonomous vehicle. In some examples, the operation 602 can include the sensor testing component 532 receiving map data from the map(s) 530 representing an environment of the vehicle 502. Map data may also or instead be received from a remote computing device such as the computing device(s) 538. In some examples, the map data can include locations of static objects such as positions of one or more retroreflectors.

At operation 604, the process can include determining, based at least in part on map data, a relative location of a retroreflector in an environment. For example, the sensor testing component 532 can determine a position for one or more retroreflectors (e.g., the retroreflector 406) based on the map data. The map data can represent a pose, orientation, and/or coordinate position (in x, y, and/or z space) in the environment. In various examples, the sensor testing component 106 can determine an orientation of the retroreflector to select baseline data associated with expected reflectivity values for the orientation.

At operation 606, the process can include determining that a lidar sensor coupled to the autonomous vehicle is at a threshold distance from the location of the retroreflector. The threshold distance can, in various examples, be a distance between 5-10 meters, though other threshold distances are contemplated. In various examples, the test can be initiated based at least in part on determining the location of the retroreflector (e.g., by comparing coordinates associated with the lidar sensor 108 or the vehicle 102 to coordinates associated with the retroreflector).

In some examples, the lidar data can represent raw lidar data that includes some information related to distance, intensity, azimuth, etc. while in other examples, the raw lidar data may represent time and/or frequency information from which the sensor testing component 106 can determine a distance of pulse information associated with the lidar data. For example, the sensor testing component 106 can apply one or more algorithms to the lidar data to determine pulse distance information usable for comparing to baseline data.

In some examples, the test can be targeted to specific regions in the environment (e.g., a front region, a rear region, a right side, a left side, relative to a sensor position). That is, the lidar data associated with the test can be a 360-degree scan of the environment, and a portion of the 360-degree scan can be compared to baseline data, as further explained herein.

In various examples, initiating the test of the lidar sensor can also or instead include identifying a number of scans to perform over time. That is, the received lidar data can represent multiple scans by the lidar sensor 108 over a time period. In other words, initiating the test can include specifying a number of tests, or scans, to conduct, and specific times and/or distances at which to conduct each test.

At operation 608, the process can include receiving lidar data associated with a surface of the retroreflect. The lidar data can be associated with a lidar sensor in a test environment or a lidar sensor coupled to a vehicle such as an autonomous vehicle (vehicle 102) traversing an environment. In some examples, the lidar data can be received over time such that the lidar data represents data captured by the lidar sensor at a first time and a second time. The lidar data can be received by the sensor testing component 106 at substantially a same time that the lidar data is captured by the lidar sensor while in other examples the lidar data can be received after a period of time, or at pre-determined intervals (e.g., every two minutes, every threshold number of image frames, etc.).

In some examples, the lidar data can represent raw lidar data that includes some distance information, intensity information, pulse information (e.g., pulse width, pulse height, etc.) while in other examples, the raw lidar data may represent time and/or frequency information. The operation 608 can include the sensor testing component 106 receiving information for one or more pulses, intensities, etc. associated with the lidar data.

Though the process 600 is discussed in the context of a lidar sensor in some examples the techniques discussed herein can include other sensor types such as image sensors, time of flight sensors, radar sensors, sonar sensors, etc., can capture sensor data (e.g., receiving or capturing image data from one or more image sensors of an autonomous vehicle).

At operation 610, the process can include comparing, as a comparison, the lidar data to baseline retroreflector data. For example, the operation 610 can include the sensor testing component 106 comparing pulse information, intensity information, or other information associated with the lidar data to baseline data representing expected pulse, intensity, etc. values. For instance, the sensor testing component 106 can implement a mathematical algorithm, heuristic, and the like to identify difference(s) between data points in the lidar data and information associated with data points in the baseline data. In some examples, the sensor testing component 106 can determine a difference between one or more pulses associated with the lidar data and a pulse threshold (e.g., a height threshold, a width threshold, an average of width times height threshold, etc.). For example, the sensor testing component 106 can apply one or more algorithms to the lidar data to determine pulse information.

At operation 612, the process can include determining, based at least in part on the comparison, a degraded state of the lidar sensor. Generally, the degraded state can represent an impact of an obstruction on the transparency being emitted from the lidar sensor. The operation 612 can include the sensor testing component 106 employing a statistical and/or a machine learned model to the compared data to determine a level of degradation of the lidar sensor 108.

At operation 614, the process can include determining that the degraded state meets or exceeds a degradation threshold. For example, the sensor testing component 106 can compare the value associated with the degree of transparency (e.g., the obstruction score) to a pre-determined degradation threshold representing an acceptable level of operation for the lidar sensor. For example, the sensor testing component 106 can determine that the degraded state meets or exceeds the degradation threshold for operating the lidar sensor. The degradation threshold can be based at least in part on a vehicle control policy, historical degradation state values, and so on.

The operation 614 may be followed by the operation 616 if the degraded state meets or exceeds the degradation threshold (e.g., "yes" in the operation 614). The operation 614 may continue to operation 602 if the degraded state is below the degradation threshold (e.g., "no" in the operation 614).

At operation 616, the process can include performing an action based at least in part on the degraded state meeting or exceeding the degradation threshold, the action including at least one of: initiating a cleaning operation to clean an outer surface of the lidar sensor; initiating a calibration operation; initiating a maintenance operation; or controlling the autonomous vehicle in the environment.

As discussed herein, an output(s) from the sensor testing component 106 can be sent to one or more of: a vehicle computing device (e.g., the vehicle computing device 104 or 504), a perception component (e.g., the perception component 522), a prediction component (the prediction component 524), a planning component (e.g., the planning component 526), the cleaning component 536, and the like. The output(s) from the sensor testing component 106 can also or instead be sent to a remote computing device configured to train the sensor testing component 106.

FIG. 6 illustrates example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. For instance, the example process may omit operation 614 and the operation 616 can be performed based at least in part on the degraded state determination of the operation 612 (e.g., a value indicated a degree of degradation).

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples described herein.

A: A system comprising: one or more processors; and one or more non-transitory computer-readable media storing computer-executable instructions that, when executed, cause the one or more processors to perform operations comprising: receiving map data representing an environment proximate an autonomous vehicle; determining, based at least in part on map data, a location of a retroreflector in an environment; determining that a lidar sensor coupled to the autonomous vehicle is at a threshold distance from the location of the retroreflector; receiving lidar data associated with a surface of the retroreflector; comparing, as a comparison, the lidar data to baseline retroreflector data; determining, based at least in part on the comparison, a degraded state of the lidar sensor; determining that the degraded state meets or exceeds a degradation threshold; and performing an action based at least in part on the degraded state meeting or exceeding the degradation threshold, the action including at least one of: initiating a cleaning operation to clean an outer surface of the lidar sensor; initiating a calibration operation; initiating a maintenance operation; or controlling the autonomous vehicle in the environment.

B: The system of paragraph A, wherein: comparing the lidar data to the baseline retroreflector data comprises comparing intensity data or pulse data associated with the surface of the retroreflector to baseline intensity data or baseline pulse data.

C: The system of paragraph A or B, the operations further comprising: receiving angle information or spatial information associated with the lidar data; and determining, based at least in part on the angle information or the spatial information, a size or a location of an obstruction associated with a lens of the lidar sensor, wherein performing the action is further based at least in part on the size or the location of the obstruction.

D: The system of any of paragraphs A-C, wherein the retroreflector comprises one of: a traffic light, a traffic sign, a street sign, a streetlight, a roadway marker, or a sticker.

E: The system of any of paragraphs A-D, wherein determining the baseline retroreflector data is based at least in part on one or more of: a retroreflector type, a distance from the lidar sensor to the retroreflector, transmission power of a lidar beam emitted from the lidar sensor, azimuth data, elevation data, pulse data, historical degradation data, reflective data associated with a surface of the autonomous vehicle, raw sensor data, or angle of return data associated with the lidar data.

F: One or more non-transitory computer-readable media storing instructions executable by a processor, wherein the instructions, when executed, cause the processor to perform operations comprising: receiving, from a lidar sensor, lidar data associated with a retroreflector in an environment; determining baseline retroreflector data associated with the retroreflector; determining, based at least in part on the lidar data and the baseline retroreflector data, a degraded state of the lidar sensor; and performing an action based at least in part on the degraded state, the action including at least one of: initiating a cleaning operation to clean an outer surface of the lidar sensor; or controlling a vehicle in the environment.

G: The one or more non-transitory computer-readable media of paragraph F, wherein receiving the lidar data associated with the retroreflector comprises receiving data representing pulse information, lidar point cloud data, or raw sensor data associated with the retroreflector.

H: The one or more non-transitory computer-readable media of paragraph F or G wherein: determining the degraded state comprises comparing intensity data or pulse data associated with a reflective surface of the retroreflector to baseline intensity data or baseline pulse data.

I: The one or more non-transitory computer-readable media of any of paragraphs F-H, the operations further comprising: receiving angle information or spatial information associated with the lidar data; and determining, based at least in part on the angle information or the spatial information, a size or a location of an obstruction associated with a lens of the lidar sensor, wherein performing the action is further based at least in part on the size or the location of the obstruction.

J: The one or more non-transitory computer-readable media of any of paragraphs F-I, wherein determining the baseline retroreflector data is based at least in part on one or more of: environmental data associated with a time that the lidar data is received, historical sensor data, or map data.

K: The one or more non-transitory computer-readable media of any of paragraphs F-J, wherein the lidar sensor is a first lidar sensor and the lidar data represents first intensity values and the operations further comprise: receiving second lidar data from a second lidar sensor different from the first lidar sensor, wherein determining the baseline retroreflector data is based at least in part on second intensity values of the second lidar data.

L: The one or more non-transitory computer-readable media of paragraph K, wherein the first intensity values and the second intensity values are associated with a same angle of arrival or same azimuth.

M: The one or more non-transitory computer-readable media of paragraph K or L, the operations further comprising: determining, based at least in part on the degraded state, an obstruction on at least a portion of the outer surface of the lidar sensor; and determining a classification of the obstruction, wherein performing the action is further based at least in part on the classification.

N: The one or more non-transitory computer-readable media of any of paragraphs F-M, the operations further comprising: determining, as degraded state history data, the degraded state over a period of time; wherein performing the action is further based at least in part on the degraded state history data.

O: The one or more non-transitory computer-readable media of any of paragraphs F-N, wherein determining the degraded state comprises: inputting the lidar data into a machine learned model; and receiving, from the machine learned model, the degraded state of the lidar sensor.

P: The one or more non-transitory computer-readable media of any of paragraphs F-O, wherein: the lidar sensor is coupled to the vehicle, and controlling the vehicle in the environment comprises determining a direction of travel for the vehicle based at least in part on the degraded state of the lidar sensor.

Q: A method comprising: receiving, from a lidar sensor, lidar data associated with a retroreflector in an environment; determining baseline retroreflector data associated with the retroreflector; determining, based at least in part on the lidar data and the baseline retroreflector data, a degraded state of the lidar sensor; and performing an action based at least in part on the degraded state, the action including at least one of: initiating a cleaning operation to clean an outer surface of the lidar sensor; or controlling a vehicle in the environment.

R: The method of paragraph Q, wherein: determining the degraded state comprises comparing intensity data or pulse data associated with a reflective surface of the retroreflector to baseline intensity data or baseline pulse data.

S: The method of paragraph Q or R, further comprising: determining, based at least in part on the lidar data, a number of lidar returns associated with a region of the retroreflector, wherein comparing the lidar data to the baseline retroreflector data comprises comparing the number of lidar returns associated with the region of the retroreflector to the baseline retroreflector data representing an expected number of lidar returns.

T: The method of any of paragraphs Q-S, wherein the action includes: receiving sensor data from a sensor type different from the lidar sensor; and determining a confidence level associated with the degraded state based at least in part on the sensor data, wherein performing the action is further based at least in part on the confidence level.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. One or more non-transitory computer-readable media storing instructions executable by a processor, wherein the instructions, when executed, cause the processor to perform operations comprising:
   receiving, from a lidar sensor, lidar data associated with a retroreflector in an environment;
   determining baseline retroreflector data associated with the retroreflector;
   determining, based at least in part on the lidar data and the baseline retroreflector data, a degraded state of the lidar sensor;
   determining, as degraded state history data, the degraded state over a period of time; and
   performing an action based at least in part on the degraded state and the degraded state history data, the action including at least one of:
   initiating a cleaning operation to clean an outer surface of the lidar sensor; or
   controlling a vehicle in the environment.

2. The one or more non-transitory computer-readable media of claim 1, wherein receiving the lidar data associated with the retroreflector comprises receiving data representing pulse information, lidar point cloud data, or raw sensor data associated with the retroreflector.

3. The one or more non-transitory computer-readable media of claim 1 wherein:
   determining the degraded state comprises comparing intensity data or pulse data associated with a reflective surface of the retroreflector to baseline intensity data or baseline pulse data.

4. The one or more non-transitory computer-readable media of claim 1, the operations further comprising:
receiving angle information or spatial information associated with the lidar data; and
determining, based at least in part on the angle information or the spatial information, a size or a location of an obstruction in a field of view of the lidar sensor,
wherein performing the action is further based at least in part on the size or the location of the obstruction.

5. The one or more non-transitory computer-readable media of claim 1, wherein determining the baseline retroreflector data is based at least in part on one or more of:
environmental data associated with a time that the lidar data is received,
historical sensor data, or
map data.

6. The one or more non-transitory computer-readable media of claim 1, wherein the lidar sensor is a first lidar sensor and the lidar data represents first intensity values and the operations further comprise:
receiving second lidar data from a second lidar sensor different from the first lidar sensor,
wherein determining the baseline retroreflector data is based at least in part on second intensity values of the second lidar data.

7. The one or more non-transitory computer-readable media of claim 6, wherein the first intensity values and the second intensity values are associated with a same angle of arrival or same azimuth.

8. The one or more non-transitory computer-readable media of claim 6, the operations further comprising:
determining, based at least in part on the degraded state, an obstruction on at least a portion of the outer surface of the lidar sensor; and
determining a classification of the obstruction,
wherein performing the action is further based at least in part on the classification.

9. The one or more non-transitory computer-readable media of claim 1, wherein determining the degraded state comprises:
inputting the lidar data into a machine learned model; and
receiving, from the machine learned model, the degraded state of the lidar sensor.

10. The one or more non-transitory computer-readable media of claim 1, wherein:
the lidar sensor is coupled to the vehicle, and
controlling the vehicle in the environment comprises determining a direction of travel for the vehicle based at least in part on the degraded state of the lidar sensor.

11. A method comprising:
receiving, from a lidar sensor, lidar data associated with a retroreflector in an environment;
determining baseline retroreflector data associated with the retroreflector;
determining, based at least in part on the lidar data and the baseline retroreflector data, a degraded state of the lidar sensor;
determining, as degraded state history data, the degraded state over a period of time; and
performing an action based at least in part on the degraded state and the degraded state history data, the action including at least one of:
initiating a cleaning operation to clean an outer surface of the lidar sensor; or
controlling a vehicle in the environment.

12. The method of claim 11, wherein:
determining the degraded state comprises comparing intensity data or pulse data associated with a reflective surface of the retroreflector to baseline intensity data or baseline pulse data.

13. The method of claim 11, further comprising:
determining, based at least in part on the lidar data, a number of lidar returns associated with a region of the retroreflector,
wherein comparing the lidar data to the baseline retroreflector data comprises comparing the number of lidar returns associated with the region of the retroreflector to the baseline retroreflector data representing an expected number of lidar returns.

14. The method of claim 11, wherein the action includes:
receiving sensor data from a sensor type different from the lidar sensor; and
determining a confidence level associated with the degraded state based at least in part on the sensor data,
wherein performing the action is further based at least in part on the confidence level.

15. A system comprising:
one or more processors; and
one or more non-transitory computer-readable media storing computer-executable instructions that, when executed, cause the one or more processors to perform operations comprising:
receiving, from a lidar sensor, lidar data associated with a retroreflector in an environment;
determining baseline retroreflector data associated with the retroreflector;
determining, based at least in part on the lidar data and the baseline retroreflector data, a degraded state of the lidar sensor;
determining, as degraded state history data, the degraded state over a period of time; and
performing an action based at least in part on the degraded state and the degraded state history data, the action including at least one of:
initiating a cleaning operation to clean an outer surface of the lidar sensor; or
controlling a vehicle in the environment.

16. The system of claim 15, wherein receiving the lidar data associated with the retroreflector comprises receiving data representing pulse information, lidar point cloud data, or raw sensor data associated with the retroreflector.

17. The system of claim 15, wherein determining the degraded state comprises comparing intensity data or pulse data associated with a reflective surface of the retroreflector to baseline intensity data or baseline pulse data.

18. The system of claim 15, the operations further comprising:
receiving angle information or spatial information associated with the lidar data; and
determining, based at least in part on the angle information or the spatial information, a size or a location of an obstruction in a field of view of the lidar sensor,
wherein performing the action is further based at least in part on the size or the location of the obstruction.

19. The system of claim 15, wherein determining the baseline retroreflector data is based at least in part on one or more of:
environmental data associated with a time that the lidar data is received,
historical sensor data, or
map data.

20. The system of claim 15, wherein determining the degraded state comprises:
inputting the lidar data into a machine learned model; and
receiving, from the machine learned model, the degraded state of the lidar sensor.

* * * * *